(12) United States Patent
Cho et al.

(10) Patent No.: US 10,697,101 B2
(45) Date of Patent: Jun. 30, 2020

(54) MOTOR FOR WASHING MACHINE AND WASHING MACHINE HAVING THE SAME

(71) Applicant: SAMSUNG ELECTRONICS CO., LTD., Suwon-si, Gyeonggi-do (KR)

(72) Inventors: Jin-woo Cho, Seongnam-si (KR); Jong-jin Lee, Anyang-si (KR); Jin-sol Je, Seoul (KR); Tae-sang Park, Suwon-si (KR); Woon-yong Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 112 days.

(21) Appl. No.: 15/672,870

(22) Filed: Aug. 9, 2017

(65) Prior Publication Data

US 2018/0127909 A1 May 10, 2018

(30) Foreign Application Priority Data

Nov. 4, 2016 (KR) .................... 10-2016-0146859

(51) Int. Cl.
*D06F 37/30* (2020.01)
*D06F 23/02* (2006.01)
(Continued)

(52) U.S. Cl.
CPC ............. *D06F 23/025* (2013.01); *H02K 5/20* (2013.01); *H02K 9/06* (2013.01); *H02K 15/0012* (2013.01); *H02K 15/12* (2013.01); *H02K 1/32* (2013.01)

(58) Field of Classification Search
CPC ........ D06F 37/30; D06F 37/304; D06F 37/32; D06F 37/34; D06F 37/36; D06F 37/38;
(Continued)

(56) References Cited

U.S. PATENT DOCUMENTS 5,737,944 A  4/1998  Nishimura et al.
5,862,686 A  1/1999  Skrippek
(Continued)

FOREIGN PATENT DOCUMENTS

DE  19859568  6/2000
GB  2466087  6/2010
(Continued)

OTHER PUBLICATIONS

Extended European Search Report dated Apr. 5, 2018 in European Patent Application No. 17198901.5.
(Continued)

*Primary Examiner* — David G Cormier
(74) *Attorney, Agent, or Firm* — Staas & Halsey LLP

(57) ABSTRACT

A motor for a washing machine includes a stator and a rotor. The rotor includes a rotor casing including a base portion formed in a disk shape and a vertical wall extending substantially perpendicularly from an outer periphery of the base portion, a permanent magnet provided on an inner surface of the vertical wall of the rotor casing, and a connecting member provided at a center of the base portion of the rotor casing and connected to a shaft. The base portion of the rotor casing includes a first ring portion facing a coil portion of the stator and a second ring portion, provided with a plurality of air inlet holes, that is positioned between the first ring portion and the connecting member and does not face the coil portion of the stator.

20 Claims, 20 Drawing Sheets

(51) Int. Cl.
*H02K 5/20* (2006.01)
*H02K 9/06* (2006.01)
*H02K 15/00* (2006.01)
*H02K 15/12* (2006.01)
*H02K 1/32* (2006.01)

(58) Field of Classification Search
CPC .......... D06F 37/40; H02K 9/00; H02K 9/005; H02K 9/02; H02K 9/04; H02K 9/06; H02K 1/32; H02K 5/20; H02K 15/0012; H02K 15/12
See application file for complete search history.

(56) References Cited

U.S. PATENT DOCUMENTS

| | | | |
|---|---|---|---|
| 6,050,113 | A | 4/2000 | Skrippek et al. |
| 6,396,190 | B1 | 5/2002 | Ahn et al. |
| 6,914,363 | B2 | 7/2005 | Kim et al. |
| 8,403,087 | B2 | 3/2013 | Park et al. |
| 9,493,899 | B2 | 11/2016 | Lee |
| 2004/0163423 | A1 | 4/2004 | Kim et al. |
| 2004/0154345 | A1* | 8/2004 | Park ................ D06F 37/304 68/3 R |

FOREIGN PATENT DOCUMENTS

| | | |
|---|---|---|
| JP | 2002-153695 | 5/2002 |
| JP | 2003-219605 | 7/2003 |
| JP | 2007-89282 | 4/2007 |
| JP | 2008-48558 | 2/2008 |
| KR | 10-0271735 | 11/2000 |
| KR | 10-0640804 | 11/2006 |
| KR | 10-0955034 | 4/2010 |
| KR | 10-1460133 | 11/2014 |
| WO | 98/29938 | 7/1998 |

OTHER PUBLICATIONS

International Search Report and Written Opinion of the International Searching Authority dated Feb. 14, 2018 in International Patent Application No. PCT/KR2017/011728.

Examination Office Action dated Feb. 7, 2020 from European Patent Application No. 17198901.5, 6 pages.

* cited by examiner

MOTOR FOR WASHING MACHINE AND WASHING MACHINE HAVING THE SAME

CROSS-REFERENCE TO RELATED APPLICATIONS

This application claims priority from Korean Patent Application No. 10-2016-0146859 filed on Nov. 4, 2016, in the Korean Intellectual Property Office, the disclosure of which is incorporated herein by reference in its entirety.

BACKGROUND

1. Field

The disclosure relates to a motor for a washing machine. More particularly, the disclosure relates to a motor for a washing machine that can directly drive a load of a washing machine without using a speed reducer and a washing machine having the same.

2. Description of the Related Art

Generally, a motor for a washing machine is driven in two modes of washing and dewatering. Since a high driving force is required for washing, a relative high current is applied to the motor, which raises the temperature of the motor so that the efficiency of the motor is deteriorated. Since high speed rotation is required for dewatering, the rotor of the motor vibrates and noise may be generated. Therefore, the motor for the washing machine needs to effectively prevent these two problems.

Further, it is required to lower the height of the motor for the washing machine in order to increase the capacity of the washing tub while maintaining the size of the outer shape of the washing machine.

An example of the motor for a washing machine is described in U.S. Pat. No. 6,396,190 (Brushless dc motor in washing machine, filed on Jun. 6, 2000, and assigned to LG Electronics Inc.).

The conventional motor for the washing machine includes a rotor provided with a plurality of cooling fins and a plurality of ventilation holes for radiating heat. However, since the plurality of cooling fins according to the related art are located directly below the coil of the stator, there is a limit in reducing the height of the motor for the washing machine. In addition, since the plurality of ventilation holes are also provided on the bottom surface of the rotor, there is a problem in that it is not effective to draw air outside the rotor into the inside of the rotor.

SUMMARY

Additional aspects and/or advantages will be set forth in part in the description which follows and, in part, will be apparent from the description, or may be learned by practice of the disclosure.

The disclosure has been developed in order to overcome the above drawbacks and other problems associated with the conventional arrangement. An aspect of the disclosure relates to a motor for a washing machine which can efficiently perform cooling and lower a height of the motor and a washing machine having the same.

According to an aspect of the disclosure, a motor for a washing machine may include a stator and a rotor. The rotor may include a rotor casing including a base portion formed in a disk shape and a vertical wall extending substantially perpendicularly from an outer periphery of the base portion, a permanent magnet provided on an inner surface of the vertical wall of the rotor casing, and a connecting member provided at a center of the base portion of the rotor casing and connected to a shaft. The base portion of the rotor casing may include a first ring portion facing a coil portion of the stator and a second ring portion that is positioned between the first ring portion and the connecting member and does not face the coil portion of the stator. The second ring portion may be provided with a plurality of air inlet holes.

The second ring portion of the base portion of the rotor casing may protrude from the first ring portion toward the stator.

The second ring portion may include a side wall protruding from an inner circumferential surface of the first ring portion toward the stator and an upper wall extending from the side wall in parallel with the first ring portion, and the plurality of air inlet holes may be formed in the side wall of the second ring portion.

According to another aspect of the disclosure, a motor for a washing machine may include a stator and a rotor. The rotor may include a rotor casing including a base portion formed in a circular plate and a vertical wall extending substantially perpendicularly from an outer periphery of the base portion, a permanent magnet provided on an inner surface of the vertical wall of the rotor casing, and a connecting member provided at a center of the base portion of the rotor casing and connected to a shaft. The base portion of the rotor casing may include a first ring portion facing a coil portion of the stator and a second ring portion that is positioned between the first ring portion and the connecting member, protrudes toward the stator from the first ring portion, and does not face the coil portion of the stator. The second ring portion may be provided with a plurality of air inlet channels that guides air outside the rotor casing to the coil portion of the stator.

Each of the plurality of air inlet channels may include an inlet which is provided to be substantially perpendicular to the second ring portion and into which outside air is introduced, a reflecting wall extending from the second ring portion, forming a predetermined angle with the inlet, and configured to reflect the outside air introduced into the inlet to the coil portion of the stator, and a bottom wall extending from the reflecting wall and connected to the first ring portion.

The inlet may be formed on a plane in a radial direction of the base portion, and the reflecting wall may be inclined with respect to the radial direction of the base portion.

The second ring portion may include a first side wall protruding from an inner circumferential surface of the first ring portion toward the stator and an upper wall extending from the first side wall in parallel with the first ring portion, and the first side wall may be provided with a plurality of openings in fluid communication with the plurality of air inlet channels.

The connecting member may include an upper connection part provided on a top surface of the base portion, a lower connection part provided on a bottom surface of the base portion and coupled with the upper connection part, and a serration boss disposed at a center of each of the upper connection part and the lower connection part.

The plurality of air inlet channels may be formed separately from the base portion.

According to another aspect of the disclosure, a motor for a washing machine may include a stator and a rotor. The rotor may include a rotor casing including a base portion formed in a disk shape and a vertical wall extending substantially perpendicularly from an outer periphery of the base portion, a permanent magnet provided on an inner surface of the vertical wall of the rotor casing, and a connecting member provided at a center of the base portion of the rotor casing and connected to a shaft. The base portion of the rotor casing may include a first ring portion facing a coil portion of the stator and a second ring portion that is positioned between the first ring portion and the connecting member and does not face the coil portion of the stator. The second ring portion may protrude from the first ring portion toward the stator, and a connecting portion connecting the first ring portion and the second ring portion may be provided with a plurality of air inlet holes.

The motor for a washing machine having the above-described structure may be applied to a washing machine including a drum or a pulsator.

Other objects, advantages and salient features of the disclosure will become apparent from the following detailed description, which, taken in conjunction with the accompanying drawings, discloses preferred embodiments.

BRIEF DESCRIPTION OF THE DRAWINGS

These and/or other aspects and advantages of the disclosure will become apparent and more readily appreciated from the following description of the embodiments, taken in conjunction with the accompanying drawings of which.

DETAILED DESCRIPTION

Figure 1:
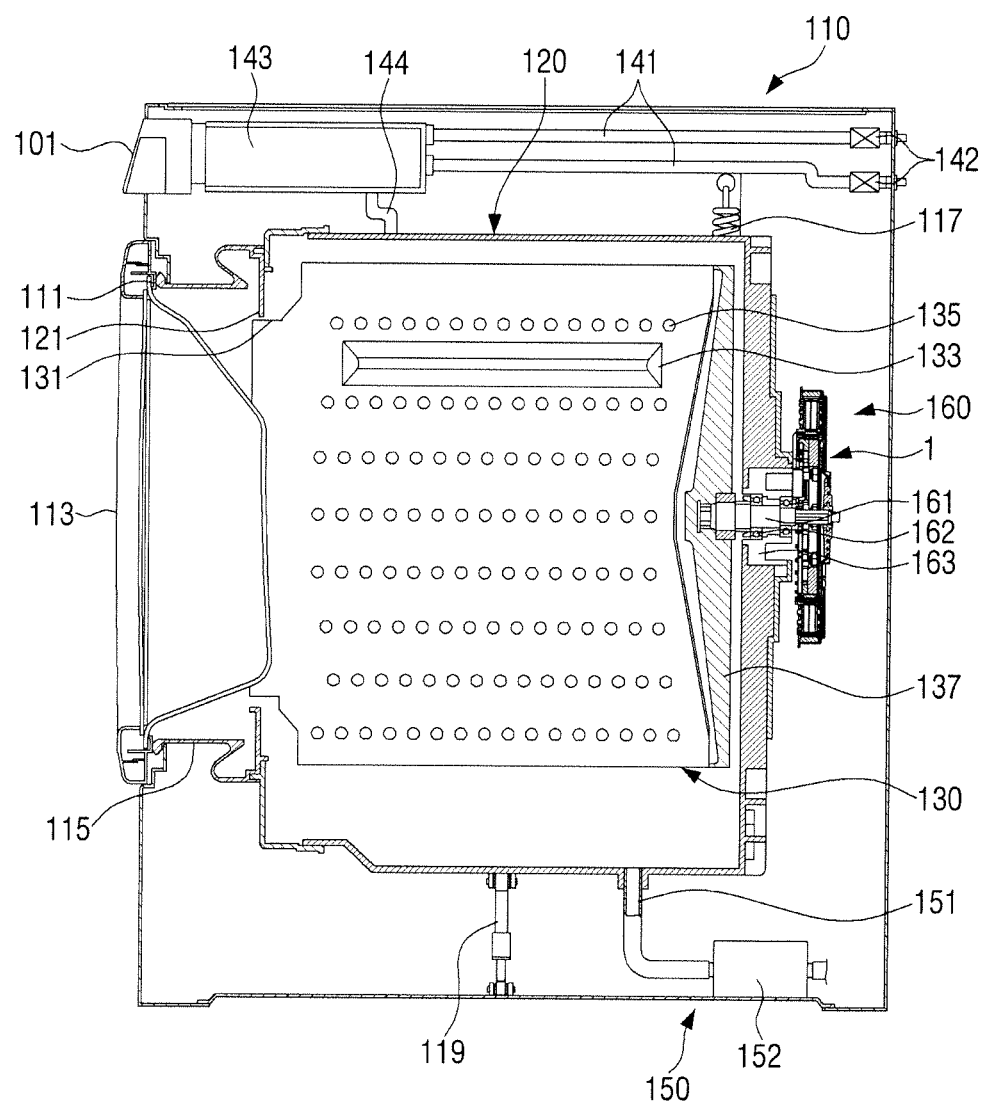
FIG. 1 is a cross-sectional view illustrating a washing machine provided with a motor for a washing machine according to an embodiment of the disclosure.

Throughout the drawings, like reference numerals will be understood to refer to like parts, components and structures.

Hereinafter, various exemplary embodiments of the disclosure will be described in detail with reference to the accompanying drawings.

The matters defined herein, such as a detailed construction and elements thereof, are provided to assist in a comprehensive understanding of this description. Thus, it is apparent that exemplary embodiments may be carried out without those defined matters. Also, well-known functions or constructions are omitted to provide a clear and concise description of exemplary embodiments. Further, dimensions of various elements in the accompanying drawings may be arbitrarily increased or decreased for assisting in a comprehensive understanding.

The terms "first", "second", etc. may be used to describe diverse components, but the components are not limited by the terms. The terms are only used to distinguish one component from the others.

The terms used in the application are only used to describe the exemplary embodiments, but are not intended to limit the scope of the disclosure. The singular expression also includes the plural meaning as long as it does not differently mean in the context. In the application, the terms "include" and "consist of" designate the presence of features, numbers, steps, operations, components, elements, or a combination thereof that are written in the specification, but do not exclude the presence or possibility of addition of one or more other features, numbers, steps, operations, components, elements, or a combination thereof.

FIG. 1 is a cross-sectional view illustrating a washing machine provided with a motor for a washing machine according to an embodiment of the disclosure.

Referring to FIG. 1, a washing machine 100 provided with a motor for a washing machine according to an embodiment of the disclosure may include a cabinet 110 forming an outer appearance of the washing machine 100, a water tub 120 disposed inside the cabinet to receive washing water, a drum 130 rotatably disposed inside the water tub 120, and a driver 160 configured to rotate the drum 130.

The cabinet 110 is provided with a control panel 101 including an input portion configured to receive an operation command of the washing machine 100 from a user and a display portion configured to display operation information of the washing machine 100.

A laundry inlet 111 is provided on the front surface of the cabinet 110 to allow laundry to be introduced into the drum 130, and openings 121 and 131 corresponding to the laundry inlet 111 are formed in the front surface of each of the water tub 120 and the drum 130, respectively. A door 113 for opening and closing the laundry inlet 111 is rotatably disposed on the front surface of the cabinet 110.

A diaphragm 115 is provided between the laundry inlet 111 of the cabinet 110 and the opening 121 of the water tub 120. The diaphragm 115 forms a passage through which the laundry is passed between the laundry inlet 111 of the cabinet 110 and the opening 121 of the water tub 120, and reduces vibration transmitted to the front surface of the cabinet 110 when the drum 130 rotates. Further, the diaphragm 115 prevents the washing water in the water tub 120 from leaking to the outside of the cabinet 110.

A spring 117 may be provided between the water tub 120 and the cabinet 110 and support the water tub 120 from above. The spring 117 may mitigate vibration and noise caused by the movement of the water tub 120 by the elastic force. Also, the water tub 120 may be supported by at least one damper 119 so as to mitigate vibrations and shocks caused by the movement of the water tub 120. In FIG. 1, the damper 119 is disposed on the inner bottom surface of the cabinet 110 and supports the water tub 120. As another example, the damper 119 may be disposed to support the water tub 120 on the upper side, the left side, and the right side in addition to the inner bottom surface of the cabinet 110.

A water supply apparatus 140 for supplying water to the water tub 120 is provided on the upper side of the cabinet 110, and a water drainage apparatus 150 for discharging washing water used for washing to the outside is provided on the lower side of the cabinet 110.

The water supply apparatus 140 may include a water supply pipe 141 connected to an external water supply source, a water supply valve 142 disposed in the water supply pipe 141 to open and close the water supply pipe 141, a detergent supply apparatus 143 configured to mix the detergent into the water delivered through the water supply pipe 141, and a washing water supply pipe 144 connecting the detergent supply apparatus 143 and the water tub 120 to guide water and detergent to the water tub 120.

The water drainage apparatus 150 may include a drain pipe 151 connected to a lower portion of the water tub 120 and configured to guide the washing water used in the water tub 120 to be discharged to the outside of the cabinet 110 and a drain pump 152 provided in the drain pipe 151 and to allow the washing water to be discharged to the outside through the drain pipe 151.

The drum 130 is formed in a hollow cylindrical shape, and a plurality of through holes 135 through which washing water can pass are provided on the outer circumferential surface of the drum 130. A plurality of lifters 133 are disposed on the inner circumferential surface of the drum 130 at certain intervals in the circumferential direction and lift the laundry upward.

The driver 160 rotates the drum 130, and is disposed on the rear surface of the water tub 120. The driver 160 may include a drive shaft 161 and a motor 1 for a washing machine (hereinafter referred to as a washing machine motor 1).

The drive shaft 161 is disposed on the rear surface of the drum 130, and transmits the power of the washing machine motor 1 to the drum 130. One end of the drive shaft 161 is connected to a rear plate 137 of the drum 130, and the other end of the drive shaft 161 extends to the outside of the rear wall of the water tub 120. A plurality of bearings 162 rotatably supporting the drive shaft 161 are provided on the rear wall of the water tub 120. The plurality of bearings 162 may be supported by a bearing housing 163 provided on the rear wall of the water tub 120.

The washing machine motor 1 rotates the drive shaft 161 directly connected to the drum 130. In other words, the washing machine motor 1 is a direct drive motor that directly drives a load such as the drum 130 without using a power transmission member such as a belt, a gear, or the like.

Therefore, when the washing machine motor 1 rotates the drive shaft 161, the drum 130 connected to the drive shaft 161 rotates integrally with the drive shaft 161.

Hereinafter, the washing machine motor 1 according to an embodiment of the disclosure will be described in detail with reference to FIGS. 2 to 6B.

Figure 2:
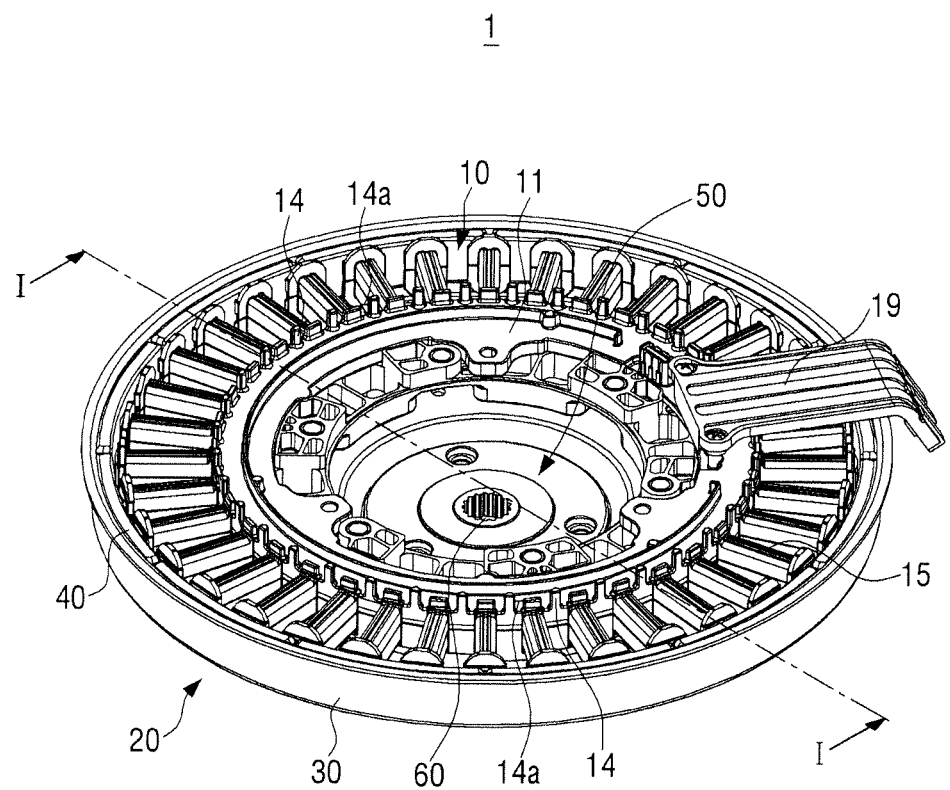
FIG. 2 is a perspective view illustrating a motor for a washing machine according to an embodiment of the disclosure.
Figure 3:
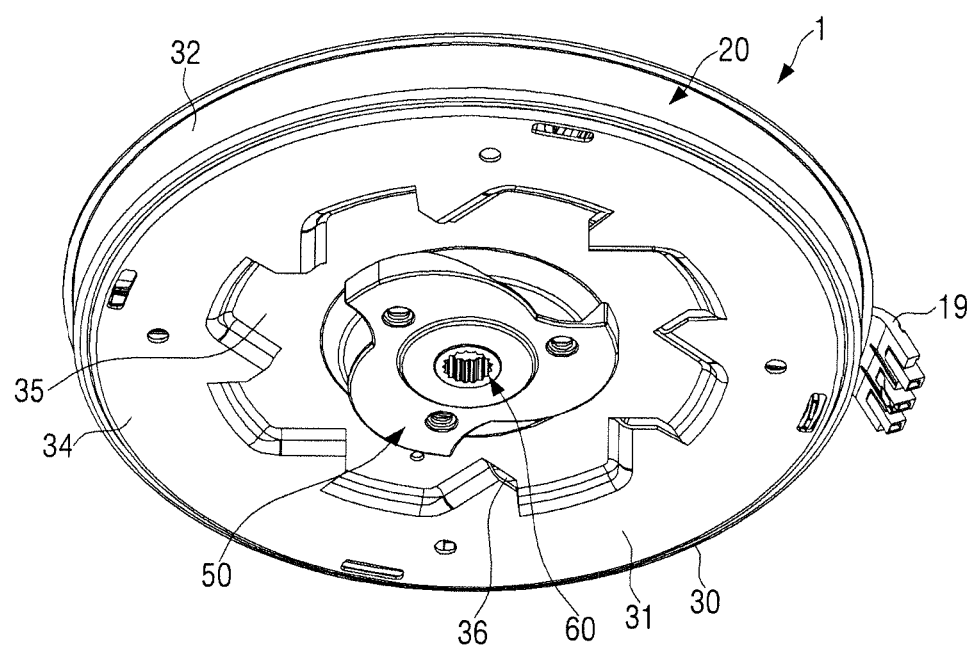
FIG. 3 is a bottom perspective view illustrating a motor for a washing machine according to an embodiment of the disclosure.
Figure 4:
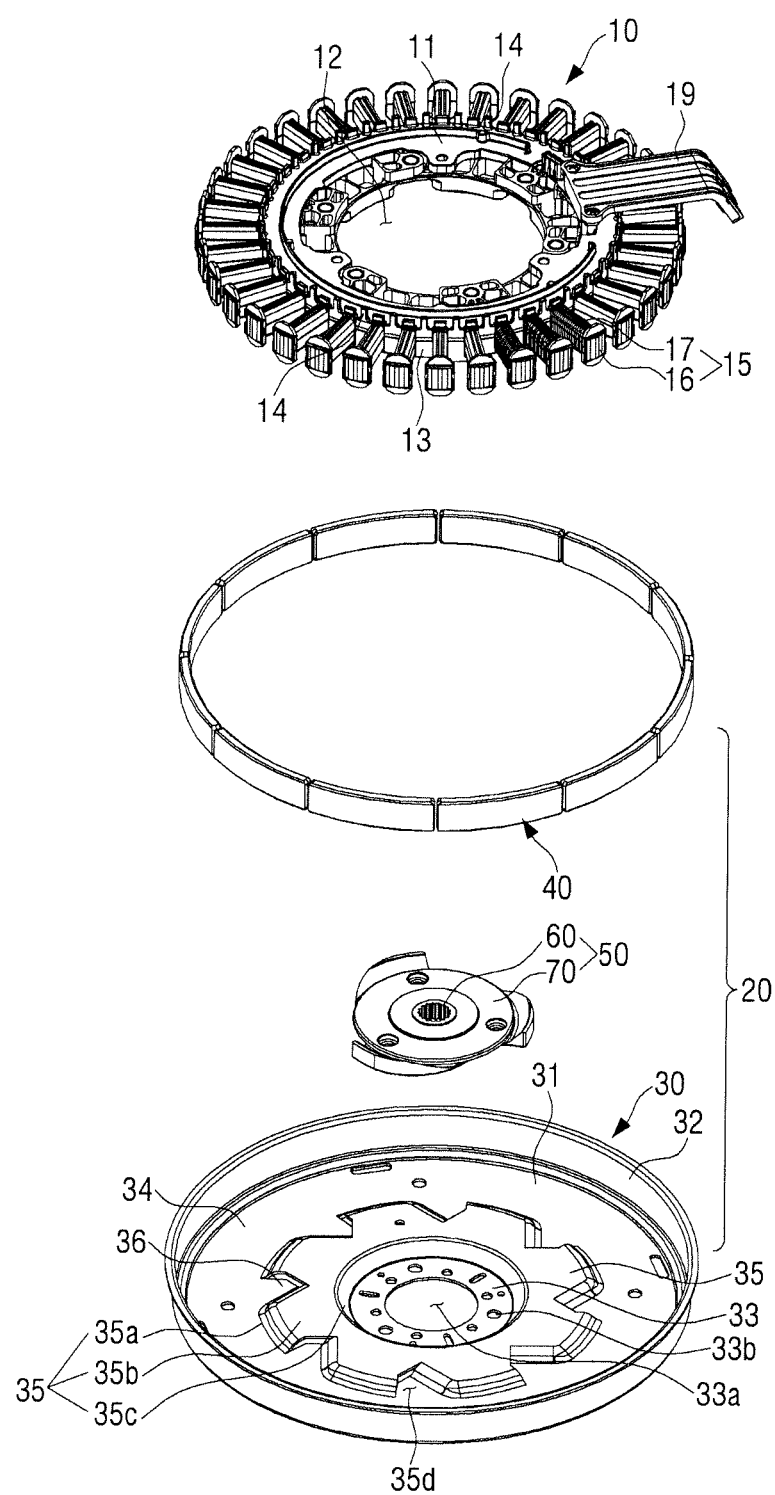
FIG. 4 is an exploded perspective view illustrating the motor for a washing machine of FIG. 2.
Figure 5:
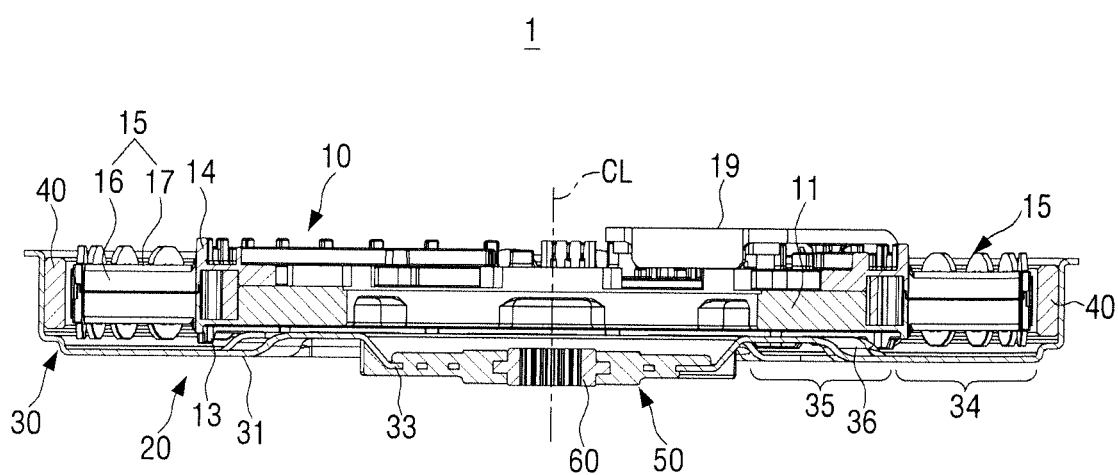
FIG. 5 is a cross-sectional view illustrating the motor for a washing machine of FIG. 2 taken along a line I-I.

FIG. 2 is a perspective view illustrating a motor for a washing machine according to an embodiment of the disclosure, and FIG. 3 is a bottom perspective view illustrating a motor for a washing machine according to an embodiment of the disclosure. FIG. 4 is an exploded perspective view illustrating the motor for a washing machine of FIG. 2, and FIG. 5 is a cross-sectional view illustrating the motor for a washing machine of FIG. 2 taken along a line I-I.

Figure 6A:
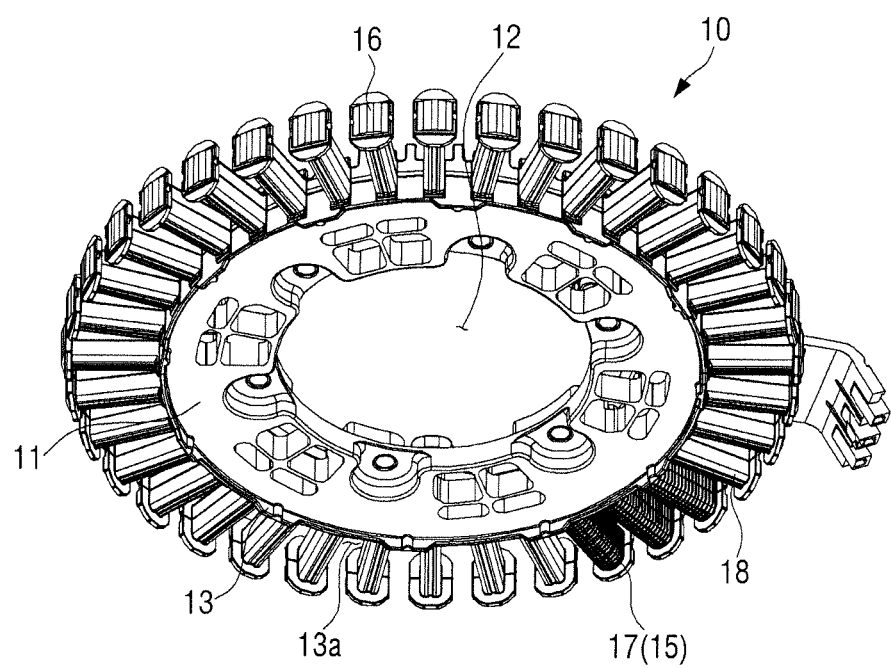
FIG. 6A is a bottom perspective view illustrating a stator of a motor for a washing machine according to an embodiment of the disclosure.
Figure 6B:
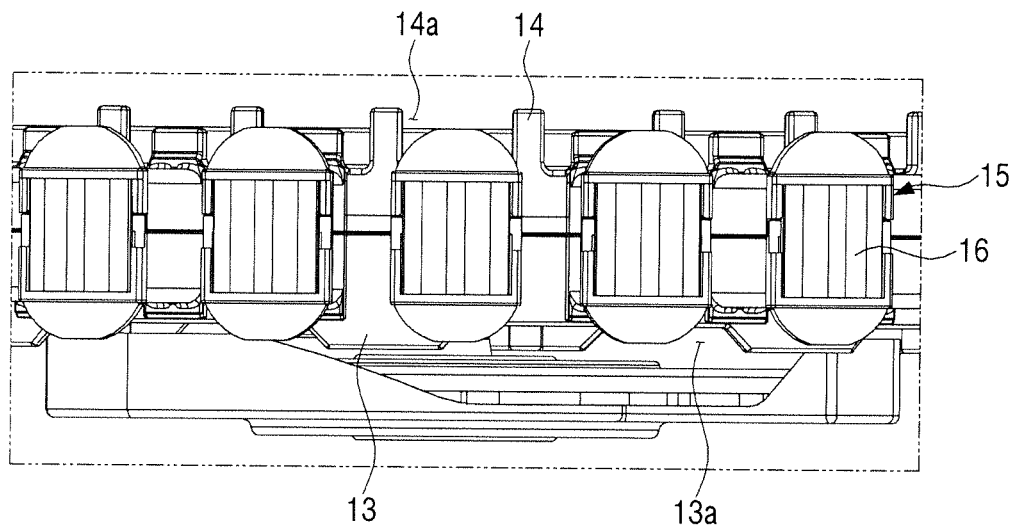
FIG. 6B is a partial front view illustrating the stator of the motor for a washing machine of FIG. 6A.

FIG. 6A is a bottom perspective view illustrating a stator of a motor for a washing machine according to an embodiment of the disclosure, and FIG. 6B is a partial front view illustrating the stator of the motor for a washing machine of FIG. 6A.

Referring to FIGS. 2 to 5, the washing machine motor 1 according to an embodiment of the disclosure may include a stator 10 and a rotor 20.

The stator 10 is fixed to the washing machine 100 and has a smaller diameter than the rotor 20. For example, the stator 10 may include a ring-shaped body portion 11 and a coil portion 15 provided around the body portion 111.

A hollow 12 is provided at the center of the body portion 11 so that the shaft may pass therethrough. A lower extension portion 13 and an upper extension portion 14 are formed around the body portion 11 and are perpendicular to the body portion 11. The lower extension portion 13 and the upper extension portion 14 protrude from the body portion 11 and have a height in that when the lower extension portion 13 or the upper extension portion 14 of the body portion 11 is positioned on a plane, the lower end or the upper end of the coil portion 15 is not in contact with the plane. Also, as illustrated in FIGS. 6A and 6B, the lower extension portion 13 is provided with a plurality of air passages 13a in the circumferential direction. Similarly, the upper extension portion 14 is provided with a plurality of air passages 14a in the circumferential direction. Accordingly, the space of the body portion 11 and the space of the coil portion 15 are in fluid communication with each other through the plurality of air passages 13a and 14a of the lower extension portion 13 and the upper extension portion 14. As a result, air drawn into the body portion 11 may move toward the coil portion 15 through the plurality of air passages 13a and 14a provided in the upper extension portion 14 and the lower extension portion 13.

The coil portion 15 is provided around the body portion 11 and may include a plurality of cores 16 radially provided around the body portion 11 and a plurality of coils 17 wound around the plurality of cores 16. For reference, FIGS. 4 and 6A illustrate a state in which the coils 17 are wound around only three of the plurality of cores 16. An insulating material 18 is exposed from each of the plurality of cores 16 around which the coil 17 is not wound.

The plurality of cores 16 are spaced at equal intervals and radially provided on the entire outer circumferential surface of the body portion 11. Each of the plurality of coils 17 is formed by winding a wire around the insulating material 18 wrapped around each of the plurality of cores 16. In other words, the plurality of coils 17 are provided in the plurality of cores 16, respectively. The plurality of cores 16 and the plurality of coils 17 are formed so as not to protrude from the upper extension portion 14 and the lower extension portion 13 of the body portion 11.

A connector 19 to electrically connect the plurality of coils 17 with an external power source or a controller is provided with on the top surface of the body portion 11.

The rotor 20 is disposed to rotate about the stator 10. Hereinafter, the rotor 20 will be described in detail with reference to FIGS. 7 to 12 attached hereto.

Figure 7:
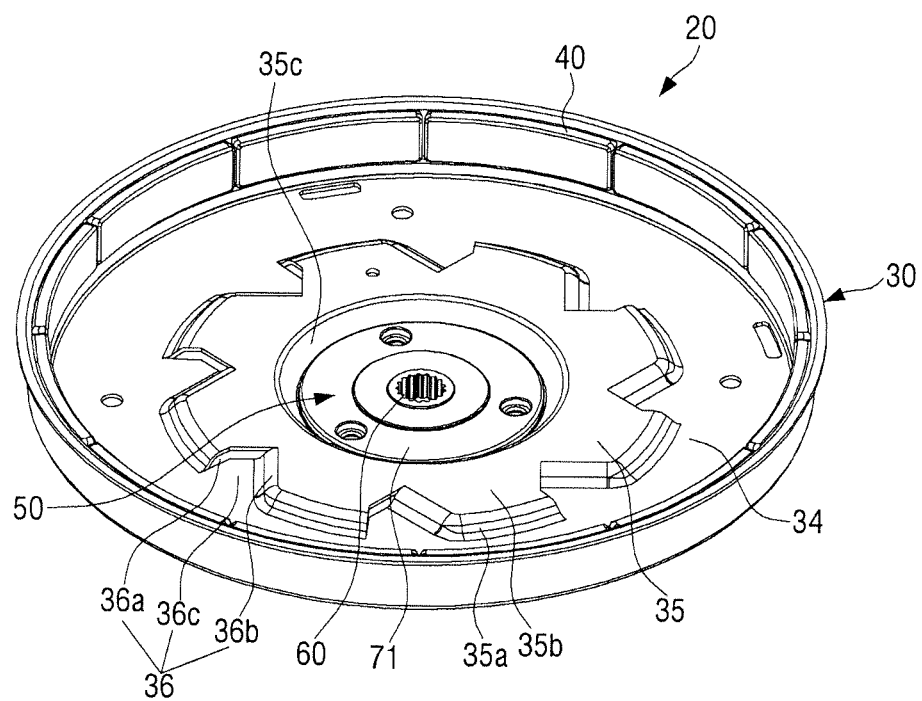
FIG. 7 is a perspective view illustrating a rotor of a motor for a washing machine according to an embodiment of the disclosure.
Figure 8:
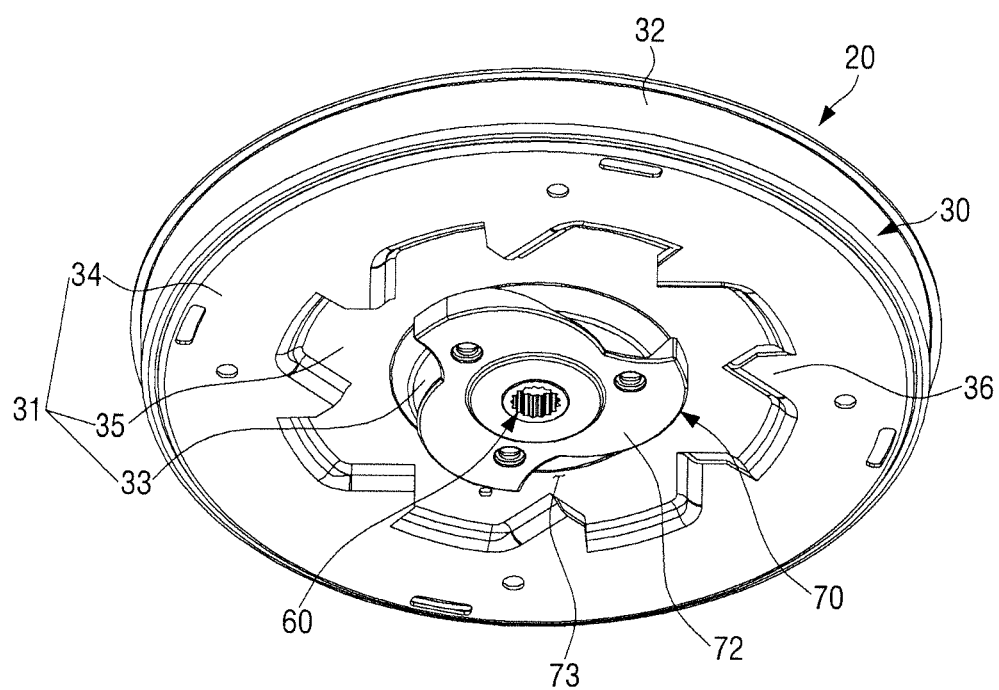
FIG. 8 is a bottom perspective view illustrating a rotor of a motor for a washing machine according to an embodiment of the disclosure.
Figure 9:
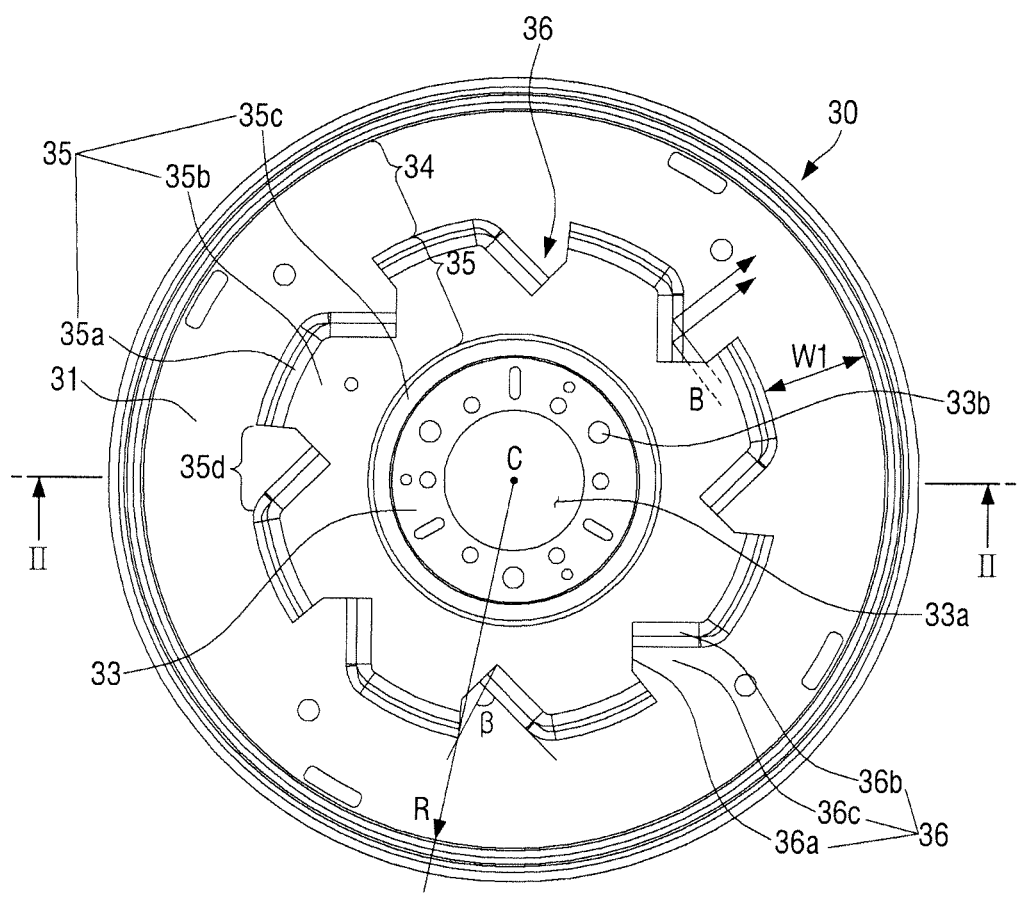
FIG. 9 is a plan view illustrating a rotor casing of a motor for a washing machine according to an embodiment of the disclosure.
Figure 10:
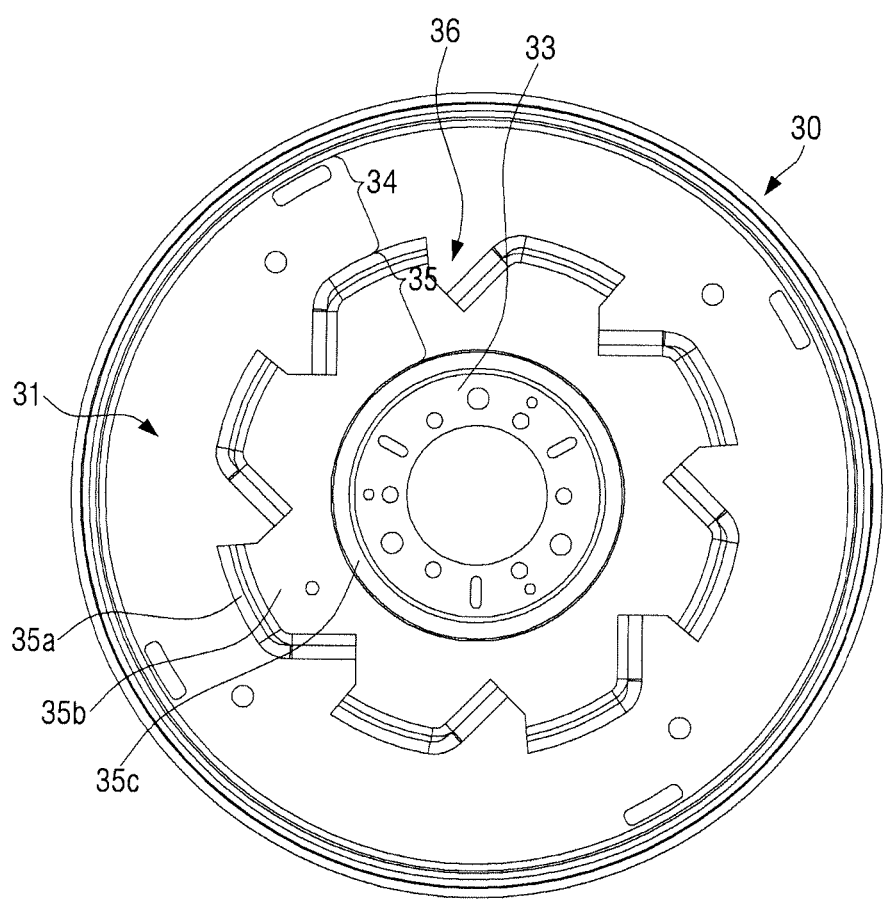
FIG. 10 is a bottom view illustrating a rotor casing of a motor for a washing machine according to an embodiment of the disclosure.
Figure 11:
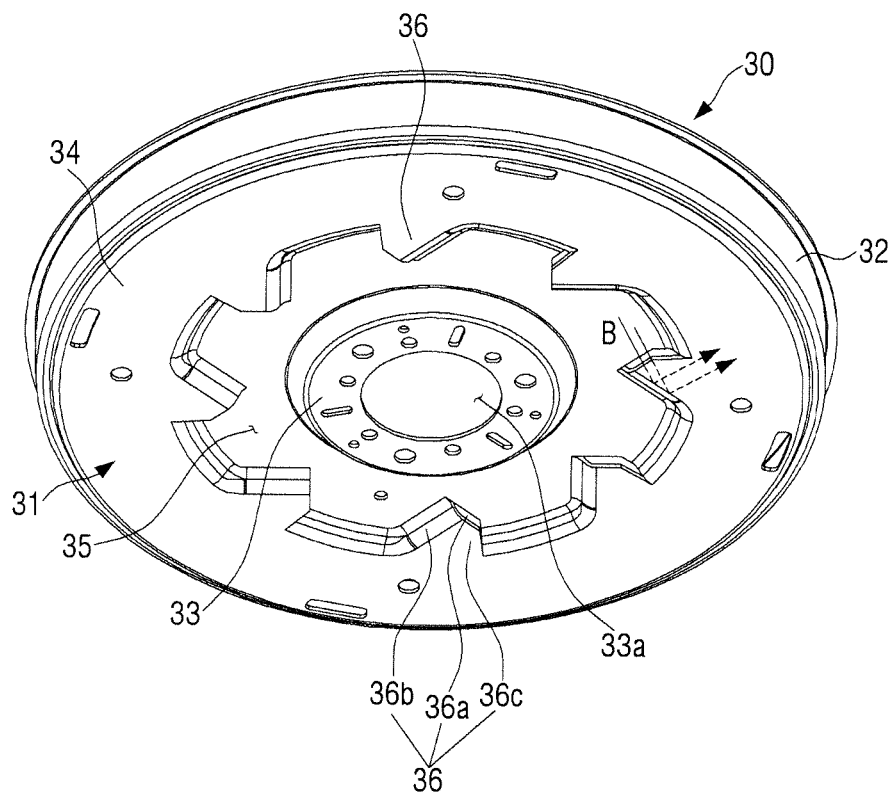
FIG. 11 is a bottom perspective view illustrating a rotor casing of a motor for a washing machine according to an embodiment of the disclosure.
Figure 12:
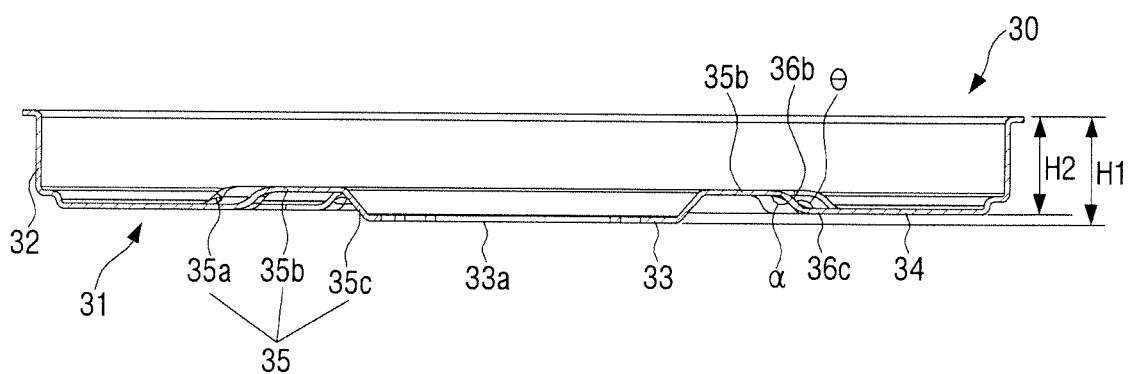
FIG. 12 is a cross-sectional view illustrating the rotor casing of FIG. 9 taken along a line II-II.

FIG. 7 is a perspective view illustrating a rotor of a motor for a washing machine according to an embodiment of the disclosure, and FIG. 8 is a bottom perspective view illustrating a rotor of a motor for a washing machine according to an embodiment of the disclosure. FIG. 9 is a plan view illustrating a rotor casing of a motor for a washing machine according to an embodiment of the disclosure. FIG. 10 is a bottom view illustrating a rotor casing of a motor for a washing machine according to an embodiment of the disclosure. FIG. 11 is a bottom perspective view illustrating a rotor casing of a motor for a washing machine according to an embodiment of the disclosure. FIG. 12 is a cross-sectional view illustrating the rotor casing of FIG. 9 taken along a line II-II.

Referring to FIGS. 7 and 8, the rotor 20 is formed in a cylindrical shape having a flat bottom and may include a rotor casing 30, a permanent magnet 40, and a connecting member 50.

Referring to FIGS. 7 to 12, the rotor casing 30 is formed in a cylindrical shape with a bottom and may include a base portion 31 formed in a disk shape and a vertical wall 32 extending substantially perpendicularly from the outer periphery of the base portion 31.

A fixing portion 33 in which the connecting member 50 is disposed is provided at the center of the base portion 31 of the rotor casing 30, and a through hole 33a is formed at the center of the fixing portion 33. A plurality of holes 33b for fixing the connecting member 50 to the rotor casing 30 are provided around the through hole 33a. The fixing portion 33 may be formed to protrude outwardly from the other portions 34 and 35 of the base portion 31. For example, in FIG. 12, the height H1 from the upper end of the rotor casing 30 to the fixing portion 33 may be greater than the height H2 from the upper end of the rotor casing 30 to the other portions 34 and 35 of the base portion 31.

The region of the base portion 31 between the fixing portion 33 and the vertical wall 32 may be divided into two ring portions 34 and 35. For example, the base portion 31 may be divided into a first ring portion 34 adjacent to the vertical wall 32 and a second ring portion 35 adjacent to the through hole 33a.

The first ring portion 34 is formed in a ring shape and faces the coil portion 15 of the stator 10 when the rotor 20 and the stator 10 are assembled with each other. In other words, the first ring portion 34 is formed to face the plurality of cores 16 and the plurality of coils 17 of the stator 10. The width W1 of the first ring portion 34 may be defined to be overlapped with at least a part of the coil portion 15 or to cover the entire coil portion 15. The first ring portion 34 is formed entirely flat.

The second ring portion 35 is provided in a ring shape between the first ring portion 34 and the fixing portion 33. In other words, the second ring portion 35 is located between the first ring portion 34 and the connecting member 50 provided on the fixing portion 33. The second ring portion 35 is formed to protrude from the first ring portion 34 toward the stator 10. That is, when base portion 31 is downward, the second ring portion 35 is located at a position higher than the first ring portion 34. In other words, the second ring portion 35 is positioned closer to the permanent magnet 40 than first ring portion 34 in the direction of the central line CL of the rotor 20 (see FIG. 5). Therefore, when the rotor 20 is assembled to the stator 10, the second ring portion 35 is positioned closer to the stator 10 than the first ring portion 34. The second ring portion 35 may be provided not to face the coil portion 15 of the stator 10. As another example, when a part of the second ring portion 35 is not interfered with the coil portion 15 of the stator 10, the second ring portion 35 may be formed so that a part of the second ring portion 35 is positioned below the coil portion 15 and faces the coil portion 15.

The second ring portion 35 may include a first side wall 35a protruding from the inner circumferential surface of the first ring portion 34 toward the stator 10, an upper wall 35b extending from the first side wall 35a in parallel with the first ring portion 34, and a second side wall 35c connecting the upper wall 35b and the outer circumferential surface of the fixing portion 33. In other words, the second side wall 35c protrudes toward the stator 10 from the outer circumferential surface of the fixing portion 33. The first side wall 35a may be formed to be at an approximately right angle or be inclined at an obtuse angle with respect to each of the upper wall 35b and the first ring portion 34. The second side wall 35c may also be formed to be at an approximately right angle or be inclined at an obtuse angle with respect to each of the upper wall 35b and the fixing portion 33.

The second ring portion 35 may be provided with a plurality of air inlet channels 36 for guiding air outside the rotor casing 30 to the coil portion 15 of the stator 10. Here, the inside of the rotor casing 30 refers to the internal space of the rotor casing 30 in which the stator 10 is disposed, and the outside of the rotor casing 30 refers to the external space of the rotor casing 30 that does not face the stator 10. Accordingly, the first side wall 35a of the second ring portion 35 is provided with a plurality of openings 35d communicating with the plurality of air inlet channels 36.

The air drawn into the plurality of air inlet channels 36 flows to the coil portion 15 of the stator 10 through the plurality of openings 35d and cools the coil portion 15 of the stator 10. Therefore, each of the plurality of air inlet channels 36 may be formed so that the air outside the rotor casing 30 flows into the inside of the rotor casing 30. The plurality of air inlet channels 36 may be provided at even intervals and radially from the center of the rotor casing 30 in the second ring portion 35. The plurality of air inlet channels 36 may be formed to protrude toward the outside of the rotor casing 30 or to protrude toward the inside of the rotor casing 30, that is, the stator 10 from the second ring portion 35. Hereinafter, the case in which the plurality of air inlet channels 36 are provided to protrude outward from the second ring portion 35 of the rotor casing 30 will be described.

For example, referring to FIGS. 9 to 11, each of the plurality of air inlet channels 36 may be formed to include an inlet 36a, a reflecting wall 36b, and a bottom wall 36c.

The inlet 36a is provided in the base portion 31 of the rotor casing 30, specifically in the second ring portion 35, is substantially perpendicular to the second ring portion 35, and is formed so that the air outside the rotor casing 30 can flow into the rotor casing 30. For example, the inlet 36a is formed on the second ring portion 35 toward the outside of the rotor casing 30. Further, the inlet 36a may be formed on a plane in the radial direction R of the base portion 31. Here, the plane in the radial direction R of the base portion 31 refers to an imaginary plane formed along the radius R connecting the center C and one point of the outer periphery of the rotor casing 30. In the embodiment, the plane on which the inlet 36a is formed has an acute angle with respect to the radial direction R.

The reflecting wall 36b extends outwardly from the second ring portion 35 at a predetermined angle with the inlet 36a. The reflecting wall 36b is formed to change the moving path of the air introduced through the inlet 36a (see arrow B). In the embodiment, the reflecting wall 36b is formed to reflect the incoming air to the coil portion 15 of the stator 10. In detail, the air introduced through the inlet 36a collides against the reflecting wall 36b and moves toward the first ring portion 34. Therefore, when the rotor 20 rotates, the air drawn in the circumferential direction of the rotor 20 through the inlet 36a formed on the plane in the radial direction R of the rotor 20 collides against the reflecting wall 36b, moves in the radial direction R of the rotor 20, and reaches the coil portion 15 of the stator 10.

The reflecting wall 36b may be formed to be inclined at a predetermined angle with respect to the base portion 31, specifically, the upper wall 35b of the second ring portion 35. In FIG. 12, an angle α between the reflecting wall 36b and the upper wall 35b is an obtuse angle. As another example, the reflecting wall 36b may be formed substantially perpendicular to the upper wall 35b of the second ring portion 35.

Also, the reflecting wall 36b may be formed at a predetermined angle with the inlet 36a, for example, 80 degrees or less. In the embodiment illustrated in FIGS. 9 to 11, the angle β between the inlet 36a and the reflecting wall 36b is approximately 45 degrees. Therefore, when the inlet 36a is formed on the plane in the radial direction R of the base portion 31, the reflecting wall 36b is formed to be inclined with respect to the radial direction R of the base portion 31.

The bottom wall 36c extends from the reflecting wall 36b and is formed to be connected to the first ring portion 34. Accordingly, the bottom wall 36c defines the air inlet channel 36 between the inlet 36a and the reflecting wall 36b. As an example, the bottom wall 36c may be provided flush with the first ring portion 34. An angle θ between the bottom wall 36c and the reflecting wall 36b may be appropriately determined in accordance with the angle α between the reflecting wall 36b and the second ring portion 35. For example, the angle θ between the bottom wall 36c and the reflecting wall 36b may be formed substantially perpendicular.

In the above description, the plurality of air inlet channels 36 are formed integrally with the rotor casing 30. However, the plurality of air inlet channels 36 may be formed separately from the rotor casing 30. For example, a reflecting wall and a bottom wall forming each of the plurality of air inlet channels may be formed separately from the rotor casing 30, and a plurality of coupling holes into which each of the plurality of air inlet channels is inserted may be provided in the second ring portion 35 of the rotor casing 30. When the plurality of separately formed air inlet channels are coupled to the plurality of coupling holes of the rotor casing 30, the plurality of air inlet channels are formed in the rotor casing 30. At this time, the air inlet channels may be formed of a material different from that of the rotor casing 30.

The permanent magnet 40 is provided on the inner surface of the vertical wall 32 of the rotor casing 30 and generates a magnetic field with the coil portion 15 of the stator 10. The permanent magnet 40 may be formed of a plurality of magnet pieces.

The connecting member 50 is provided on the fixing portion 33 of the base portion 31 of the rotor casing 30 and is connected to the drive shaft 161 (see FIG. 1) to transmit the rotation of the rotor 20 to the outside. The top surface of the connecting member 50 may be provided at a position lower than the second ring portion 35 in the direction of the stator 10. In other words, the connecting member 50 may be provided not to protrude from the second ring portion 35 toward the stator 10.

Figure 13:
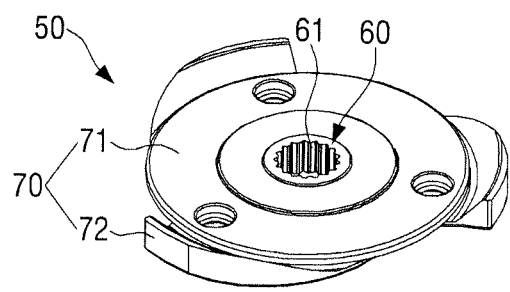
FIG. 13 is a perspective view illustrating a connecting member of a motor for a washing machine according to an embodiment of the disclosure.

For example, referring to FIG. 13, the connecting member 50 may include a serration boss 60 and a connection molding portion 70.

FIG. 13 is a perspective view illustrating a connecting member of a motor for a washing machine according to an embodiment of the disclosure.

The serration boss 60 is provided with a plurality of serrations 61 on its inner surface and may be engaged with the drive shaft 161 (see FIG. 1) that transmits power to the drum 130 (see FIG. 1). The outer circumferential surface of the drive shaft 161 is provided with serrations corresponding to the serrations 61 of the serration boss 60. Therefore, when the serrations of the drive shaft 161 are inserted into and engaged with the serrations 61 of the serration boss 60, the drive shaft 161 rotates integrally with the rotor 20 by the rotation of the rotor 20. The drive shaft 161 is connected to a load of the washing machine 100 such as a drum or a pulsator. For example, in the case of the drum washing machine 100 illustrated in FIG. 1, the drive shaft 161 is connected to the drum 130 of the drum washing machine 100. Accordingly, when the rotor 20 rotates, the drum 130 rotates. Further, in the case of a pulsator washing machine, the connecting member 50 of the rotor 20 may be connected to a shaft to which a pulsator is fixed. Accordingly, when the rotor 20 rotates, the pulsator rotates.

Referring to FIGS. 2, 3, 5, and 13, the connection molding portion 70 may include an upper connection part 71 provided on the top surface of the base portion 31 and a lower connection part 72 provided on the bottom surface of the base portion 31. The upper connection part 71 and the lower connection part 72 are coupled to each other. In the embodiment, the connecting member 50 is formed integrally with the rotor casing 30 by molding. The upper connection part 71 and the lower connection part 72 of the connection molding portion 70 are connected through a plurality of holes 33b provided in the fixing portion 33. In addition, the serration boss 60 is coupled to the rotor casing 30 integrally with the connection molding portion 70. At this time, the serration boss 60 is disposed at the centers of the upper connection part 71 and the lower connection part 72. As another example, the upper connection part 71 and the lower connection part 72 may be formed separately from the rotor casing 30, and the upper connection part 71 and the lower connection part 72 may be assembled to the rotor casing 30 using fastening elements such as bolts.

The lower connection part 72 of the connecting member 50 may be formed in a shape that generates wind and sends the wind to the plurality of air inlet channels 36 provided around the lower connection part 72 when the rotor casing 30 rotates. For example, as illustrated in FIG. 8, the outer circumferential surface of the lower connection part 72 may be formed in a substantially pinwheel shape. Alternatively, a plurality of notches may be provided on the outer circumferential surface of the lower connection part 72. In the case in which the outer circumferential surface of the lower connection part 72 is formed in a pinwheel shape or the plurality of notches are formed on the outer circumferential surface of the lower connection part 72, when the rotor casing 30 rotates, wind may be generated by the lower connection part 72 so that the amount of air introduced into the plurality of air inlet channels 36 may be increased. The plurality of notches provided in the lower connection part 72 may be formed in various shapes. For example, each of the plurality of notches may be formed in a triangular groove, a semicircular groove, a rectangular groove, or the like. The lower connection part 72 of the connecting member 50 formed in the shape of a pinwheel shown in FIG. 8 may be seen to have three notches 73 formed on the outer circumferential surface thereof.

Also, the upper connection part 71 of the connecting member 50 may be formed in a substantially pinwheel shape or have a plurality of notches similar to the lower connection part 72 as described above. When the upper connection part 71 is formed in a pinwheel shape or a plurality of notches, the effect of blowing wind toward the coil portion 15 of the stator 10 may be generated.

Hereinafter, the operation of the washing machine motor according to an embodiment of the disclosure will be described in detail with reference to FIGS. 2, 3, and 5 attached thereto.

When electricity is applied to the plurality of coils 17 of the stator 10 through the connector 19 provided in the stator 10, a magnetic field is formed by the plurality of coils 17. The rotor 20 rotates with respect to the stator 10 by the electromagnetic force acting between the coil portion 15 of the stator 10 and the permanent magnet 40 of the rotor 20. In other words, the rotor 20 disposed in the outside of the stator 10 rotates about the stator 10.

When the rotor 20 rotates, the rotor casing 30 is rotated integrally. When the rotor casing 30 rotates, air outside the rotor casing 30 is introduced into the rotor 20 through the plurality of air inlet channels 36 provided in the second ring portion 35 of the rotor casing 30. In detail, the air outside the rotor 20 is introduced into the inlets 36a of the plurality of air inlet channels 36. The incoming air flows toward the first ring portion 34 by the reflecting walls 36b of the air inlet channels 36. At this time, since the plurality of coils 17 and cores 16 of the stator 10 are positioned above the first ring portion 34, the plurality of coils 17 and cores 16 of the stator 10 are cooled by the incoming air.

At this time, when the rotor 20 rotates, the connecting member 50 coupled to the fixing portion 33 of the rotor casing 30 also rotates integrally. Since the lower connection part 72 of the connecting member 50 is formed in the shape of a pinwheel, when the connecting member 50 rotates, a flow of air may be generated by the lower connection part 72 and introduced into the rotor casing 30 through the plurality of air inlet channels 36 provided around the lower connection part 72.

With the washing machine motor 1 according to an embodiment of the disclosure as described above, since the first ring portion 34 of the rotor 20 corresponding to the coil portion 15 of the stator 10 when the rotor 20 and the stator 10 are assembled is formed in a flat shape, a gap between the rotor 20 and the stator 10 may be made as narrow as possible. Therefore, the height of the washing machine motor 1 may be reduced.

Further, since the plurality of air inlet channels 36 into which outside air is introduced are provided in the second ring portion 35 adjacent to the first ring portion 34 of the rotor casing 30, the outside air may efficiently cool the coil portion 15 of the stator 10.

In the above description, the plurality of air inlet channels 36 are formed in the rotor casing 30; however, the introduction of outside air into the rotor 20 is not limited thereto. For example, the outside air may be introduced into the rotor 20 through a plurality of air inlet holes.

Hereinafter, a rotor of a washing machine motor in which a plurality of air inlet holes are formed in a rotor casing will be described in detail with reference to FIGS. 14 and 15.

Figure 14:
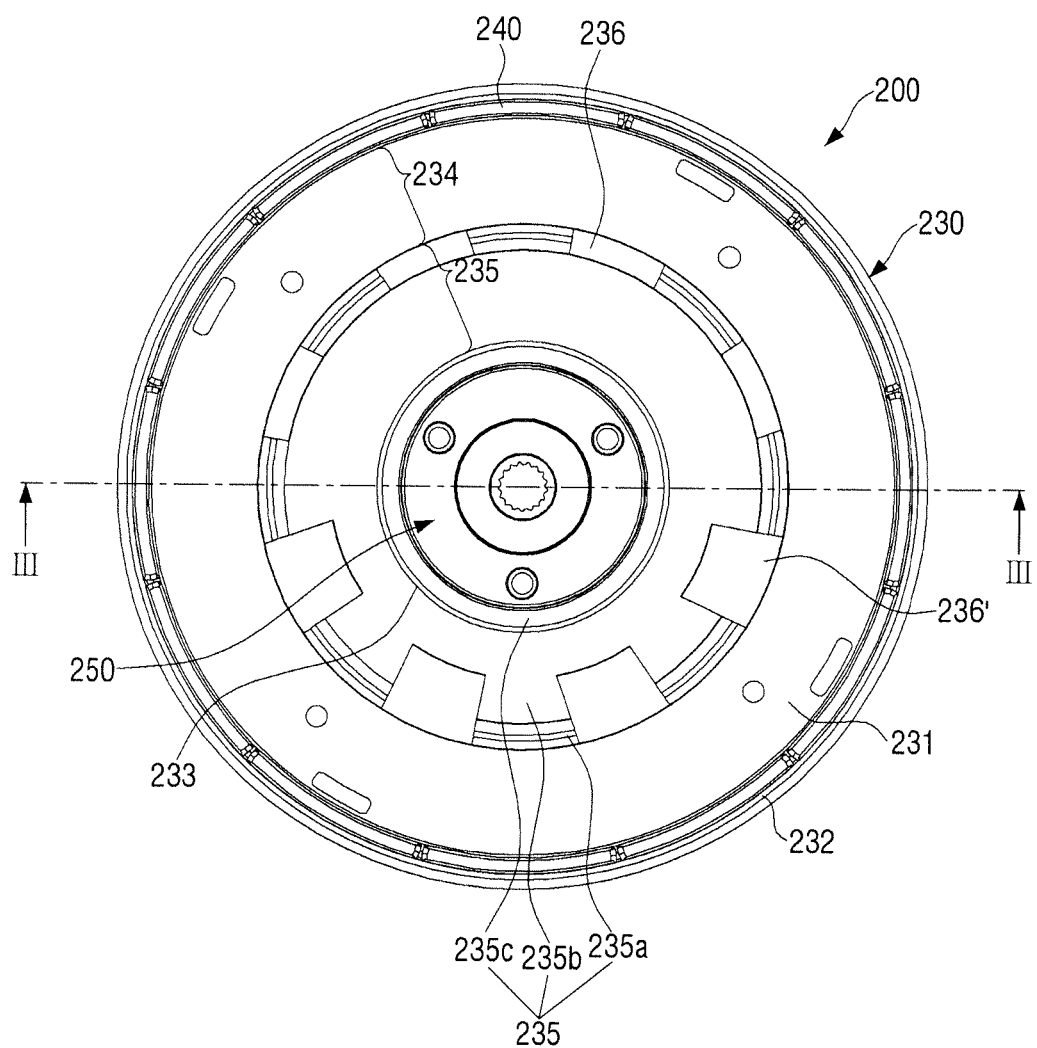
FIG. 14 is a plan view illustrating a rotor of a motor for a washing machine according to an embodiment of the disclosure.
Figure 15:
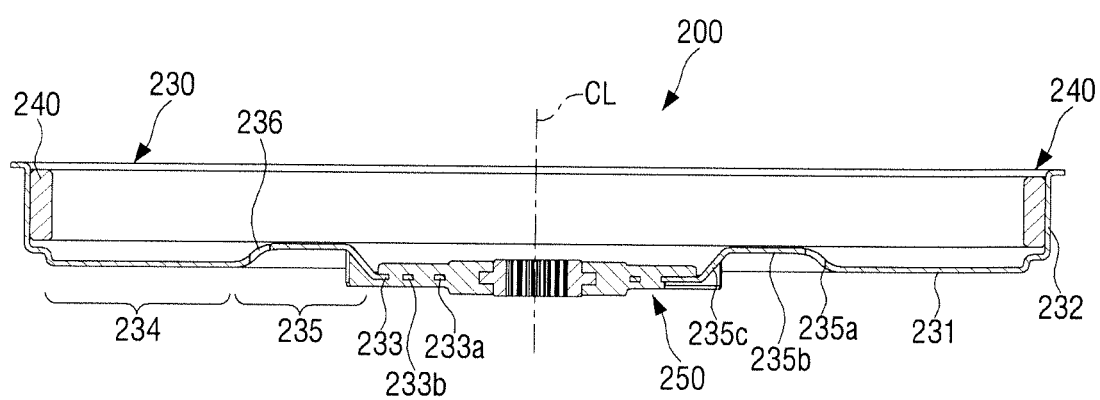
FIG. 15 is a cross-sectional view illustrating the rotor of FIG. 14 taken along a line III-III.

FIG. 14 is a plan view illustrating a rotor of a motor for a washing machine according to an embodiment of the disclosure, and FIG. 15 is a cross-sectional view illustrating the rotor of FIG. 14 taken along a line III-III.

Referring to FIGS. 14 and 15, a rotor 200 of a washing machine motor 1 may include a rotor casing 230, a permanent magnet 240, and a connecting member 250.

The permanent magnet 240 and the connecting member 250 are the same as or similar to the permanent magnet 40 and the connecting member 50 of the rotor 20 of the washing machine motor 1 according to the above-described embodiment, and a detailed description thereof is omitted.

The rotor casing 230 is formed in a cylindrical shape with a bottom and may include a base portion 231 formed in a circular plate and a vertical wall 232 extending substantially perpendicularly from the outer periphery of the base portion 231.

A fixing portion 233 in which the connecting member 250 is disposed is provided at the center of the base portion 231 of the rotor casing 30, and a through hole 233a is formed at the center of the fixing portion 233. A plurality of holes 233b for fixing the connecting member 250 to the rotor casing 230 are provided around the through hole 233a. The fixing portion 233 may be formed to protrude outwardly from the other portions of the base portion 231.

The vertical wall 232 is provided on the outer periphery of the base portion 231, and the permanent magnet 240 is provided on the inner surface of the vertical wall 232.

The region of the base portion 231 between the fixing portion 233 and the vertical wall 232 may be divided into two ring portions. For example, the base portion 231 may be divided into a first ring portion 234, which is adjacent to the vertical wall 232 and has a ring shape, and a second ring portion 235 which is adjacent to the fixing portion 233 and has a ring shape.

The first ring portion 234 is formed to face the coil portion 15 of the stator 10 when the rotor 200 is assembled to the stator 10 (see FIG. 2). In other words, the first ring portion 234 of the rotor casing 230 is formed to face the plurality of cores 16 and the plurality of coils 17 of the stator 10. The width of the first ring portion 234 may be provided to be overlapped with at least a part of the coil portion 15 of the stator 10 or to cover the entire coil portion 15. The first ring portion 234 is formed entirely flat.

The second ring portion 235 is provided between the first ring portion 234 and the fixing portion 233. In other words, the second ring portion 235 is a ring-shaped region located between the first ring portion 234 and the connecting member 250 provided at the fixing portion 233. The second ring portion 235 is formed to protrude from the first ring portion 234 toward the stator 10 (see FIG. 2) in the direction of the central line CL of the rotor 200. That is, when base portion 231 is downward, the second ring portion 235 is located at a position higher than the first ring portion 234. Therefore, when the rotor 200 is assembled to the stator 10, the second ring portion 235 is positioned closer to the stator 10 than the first ring portion 234. The second ring portion 235 may be provided not to face the coil portion 15 of the stator 10. As another example, when a part of the second ring portion 235 does not interfere with the coil portion 15 of the stator 10, the second ring portion 235 may be provided so that the part of the second ring portion 235 faces a part of the coil portion 15 of the stator 10.

As one example, the second ring portion 235 may include a first side wall 235a protruding from the inner circumferential surface of the first ring portion 234 toward the stator 10, an upper wall 235b extending from the first side wall 235a in parallel to the first ring portion 234, and a second side wall 235c connecting the upper wall 235b and the outer circumferential surface of the fixing portion 233. In other words, the second side wall 235c protrudes toward the stator 10 from the outer circumferential surface of the fixing portion 233. The first side wall 235a may be formed to be at an approximately right angle or to be inclined with respect to each of the upper wall 235b and the first ring portion 234. For example, the angle between the first side wall 235a and the upper wall 235b and the angle between the first side wall 235a and the first ring portion 234 may be about 90 degrees or an obtuse angle. The second side wall 235c may also be formed to be substantially perpendicular to or inclined with respect to each of the upper wall 235b and the fixing portion 233 similarly to the first side wall 235a. For example, the angle between the second side wall 235c and the upper wall 235b and the angle between the second side wall 235c and the fixing portion 233 may be about 90 degrees or an obtuse angle.

The plurality of air inlet holes 236 may be provided in the first side wall 235a positioned between the first ring portion 234 and the second ring portion 235. At this time, each of the plurality of air inlet holes 236 may be formed to have the same length as the height of the first side wall 235a. As another example, each of the plurality of air inlet holes 236' may be formed longer than the height of the first side wall 235a. In other words, each of the air inlet holes 236' may be formed over the first side wall 235a and the upper wall 235b. For reference, in FIG. 14, four air inlet holes 236 formed in the upper half of the second ring portion 235 of the rotor casing 230 are formed to have the same length as the height of the first side wall 235a. Four air inlet holes 236' provided in the lower half of the second ring portion 235 of the rotor casing 230 are formed over the first side wall 235a and the upper wall 235b.

When the plurality of air inlet holes 236 and 236' are formed in the second ring portion 35 of the rotor casing 230 as described above, the outside air is introduced into the interior of the rotor 200 through the plurality of air inlet holes 236 and 236', thereby effectively cooling the coil portion 15 of the stator 10.

Figure 16:
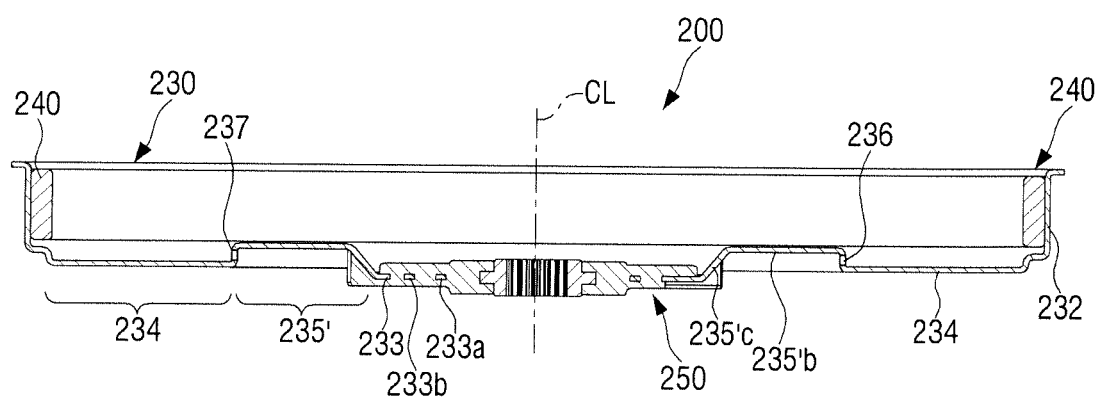
FIG. 16 is a cross-sectional view illustrating a variation of the rotor illustrated in FIGS. 14 and 15.

FIG. 16 is a cross-sectional view illustrating a variation of the rotor illustrated in FIGS. 14 and 15.

The second ring portion 235' is provided between the first ring portion 234 and the fixing portion 233. In other words, the second ring portion 235' is a ring-shaped region located between the first ring portion 234 and the connecting member 250 provided at the fixing portion 233. The second ring portion 235' is formed to protrude from the first ring portion 234 toward the stator 10 (see FIG. 2) in the direction of the central line CL of the rotor 200. That is, when base portion 231 is downward, the second ring portion 235' is located at a position higher than the first ring portion 234. Therefore, when the rotor 200 is assembled to the stator 10, the second ring portion 235' is positioned closer to the stator 10 than the first ring portion 234. The second ring portion 235' may be provided not to face the coil portion 15 of the stator 10.

The first ring portion 234 and the second ring portion 235' are connected by a connecting portion 237. The connecting portion 237 is provided substantially perpendicular to the first ring portion 234 and the second ring portion 235'. The connecting portion 237 may correspond to the first side wall 235a of the second ring portion 235 of the rotor casing 230 of the above-described embodiment.

The second ring portion 235' may include an upper wall 235'b extending from the connecting portion 237 in parallel to the first ring portion 234 and a second side wall 235'c connecting the upper wall 235'b and the outer circumferential surface of the fixing portion 233. In other words, the second side wall 235'c protrudes toward the stator 10 from the outer circumferential surface of the fixing portion 233 in the direction of the center line CL. The second side wall 235'c may be formed to be substantially perpendicular to or inclined with respect to each of the upper wall 235'b and the fixing portion 233.

The plurality of air inlet holes 236 may be provided in the connecting portion 237 located between the first ring portion 234 and the second ring portion 235'. In other words, the plurality of air inlet holes 236 may be provided between the first ring portion 234 and the second ring portion 235'. At this time, each of the plurality of air inlet holes 236 may be formed to have a length smaller than or equal to the height of the connecting portion 237. Alternatively, as another example, each of the plurality of air inlet holes 236 may be formed to have a length longer than the height of the connecting portion 237. In other words, each of the air inlet holes 236' may be formed over the connecting portion 237 and the upper wall 235'b of the second ring portion 235' (see FIG. 14).

The rotor 200 shown in FIG. 16 is the same as the rotor 200 shown in FIGS. 14 and 15 except for the second ring portion 235'; therefore, a detailed description thereof is omitted.

In the above description, the second ring portion 235 and 235' protrudes from the first ring portion 34; however, the shape of the second ring portion 235 and 235' is not limited thereto. The second ring portion may be formed on the same plane as the first ring portion.

Hereinafter, a rotor of a washing machine motor, in which the second ring portion of the rotor casing is formed on the same plane as the first ring portion, will be described in detail with reference to FIGS. 17 and 18.

Figure 17:
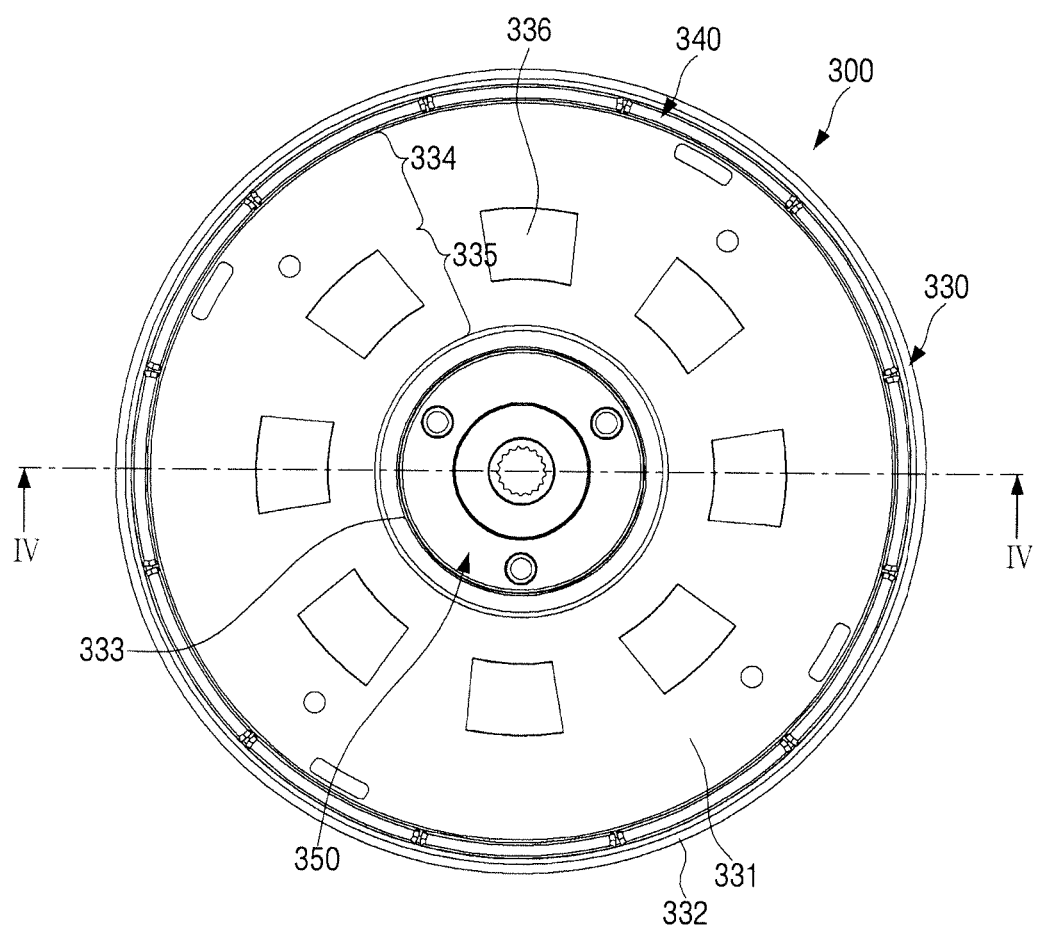
FIG. 17 is a plan view illustrating another example of a rotor of a motor for a washing machine according to an embodiment of the disclosure.
Figure 18:
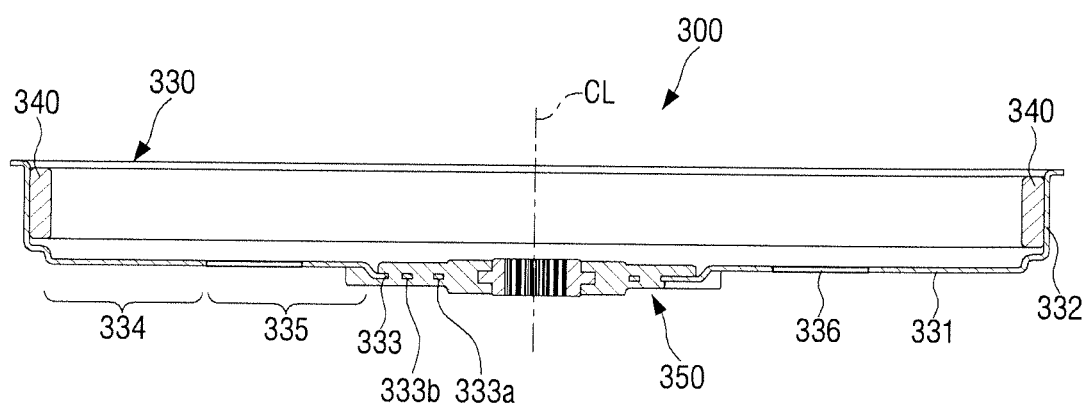
FIG. 18 is a cross-sectional view illustrating the rotor of FIG. 17 taken along a line VI-VI.

FIG. 17 is a plan view illustrating another example of a rotor of a motor for a washing machine according to an embodiment of the disclosure, and FIG. 18 is a cross-sectional view illustrating the rotor of FIG. 17 taken along a line VI-VI.

Referring to FIGS. 17 and 18, a rotor 300 of a washing machine motor 1 according to an embodiment of the disclosure may include a rotor casing 330, a permanent magnet 340, and a connecting member 350.

The permanent magnet 340 and the connecting member 350 are the same as or similar to the permanent magnet 40 and the connecting member 50 of the rotor 20 of the washing machine motor 1 according to the above-described embodiment, and a detailed description thereof is omitted.

The rotor casing 330 is formed in a cylindrical shape with a bottom and may include a base portion 331 formed in a circular plate and a vertical wall 332 extending substantially perpendicularly from the outer periphery of the base portion 331.

A fixing portion 333 in which the connecting member 350 is disposed is provided at the center of the base portion 331 of the rotor casing 330, and a through hole 333a is formed at the center of the fixing portion 333. A plurality of holes 333b for fixing the connecting member 350 to the rotor casing 330 are provided around the through hole 333a. The fixing portion 333 may be formed to protrude outwardly from the other portion of the base portion 331.

The vertical wall 332 is provided on the outer periphery of the base portion 331, and the permanent magnet 340 is provided on the inner surface of the vertical wall 332.

The region of the base portion 331 between the fixing portion 333 and the vertical wall 332 may be divided into two ring portions. For example, the base portion 231 may be divided into a first ring portion 334, which is adjacent to the vertical wall 332 and has a ring shape, and a second ring portion 335 which is adjacent to the through hole 333a and has a ring shape.

The first ring portion 334 is formed to face the coil portion 15 of the stator 10 when the rotor 300 is assembled to the stator 10 (see FIG. 2). In other words, the first ring portion 334 of the rotor casing 330 is formed to face the plurality of cores 16 and the plurality of coils 17 of the stator 10. The width of the first ring portion 334 may be provided to be overlapped with at least a part of the coil portion 15 of the stator 10 or to cover the entire coil portion 15. The first ring portion 334 is formed entirely flat.

The second ring portion 335 is provided between the first ring portion 334 and the fixing portion 333. In other words, the second ring portion 335 is a ring-shaped region located between the first ring portion 334 and the connecting member 350 provided at the fixing portion 333. The second ring portion 335 is formed on the same plane as the first ring portion 334. Thus, when base portion 331 is downward, the second ring portion 335 is located at the same height as the first ring portion 334. The second ring portion 335 may be provided not to face the coil portion 15 of the stator 10. As another example, when a part of the second ring portion 335 does not interfere with the coil portion 15 of the stator 10, the second ring portion 335 may be formed so that the part of the second ring portion 335 faces a part of the coil portion 15 of the stator 10.

A plurality of air inlet holes 336 may be provided in the second ring portion 335. At this time, each of the plurality of air inlet holes 336 may be formed to be equal to or smaller than the width of the second ring portion 335. In the embodiment shown in FIG. 17, each of the plurality of air inlet holes 336 is formed in a substantially rectangular shape, but the shape of each of the plurality of air inlet holes 336 is not limited thereto. Accordingly, the shape of each of the plurality of air inlet holes 336 may be formed in various shapes as long as air can be drawn into the rotor 300.

With the motor for a washing machine according to an embodiment of the disclosure having the above-described structure, since cooling fins do not exist in the region of the rotor corresponding to the coil portion of the stator and a plurality of air inlet channels or air inlet holes through which outside air is introduced are provided in the center portion of the stator, the coil portion of the stator may be effectively cooled. Further, the height of the motor for a washing machine may be reduced.

In the above description, the motor 1 for a washing machine according to an embodiment of the disclosure is used in the drum washing machine 100. However, the motor 1 for a washing machine according to an embodiment of the disclosure may also be used in a pulsator washing machine.

Hereinafter, a pulsator washing machine 400 provided with the motor 1 for a washing machine according to an embodiment of the disclosure will be described with reference to FIG. 19.

Figure 19:
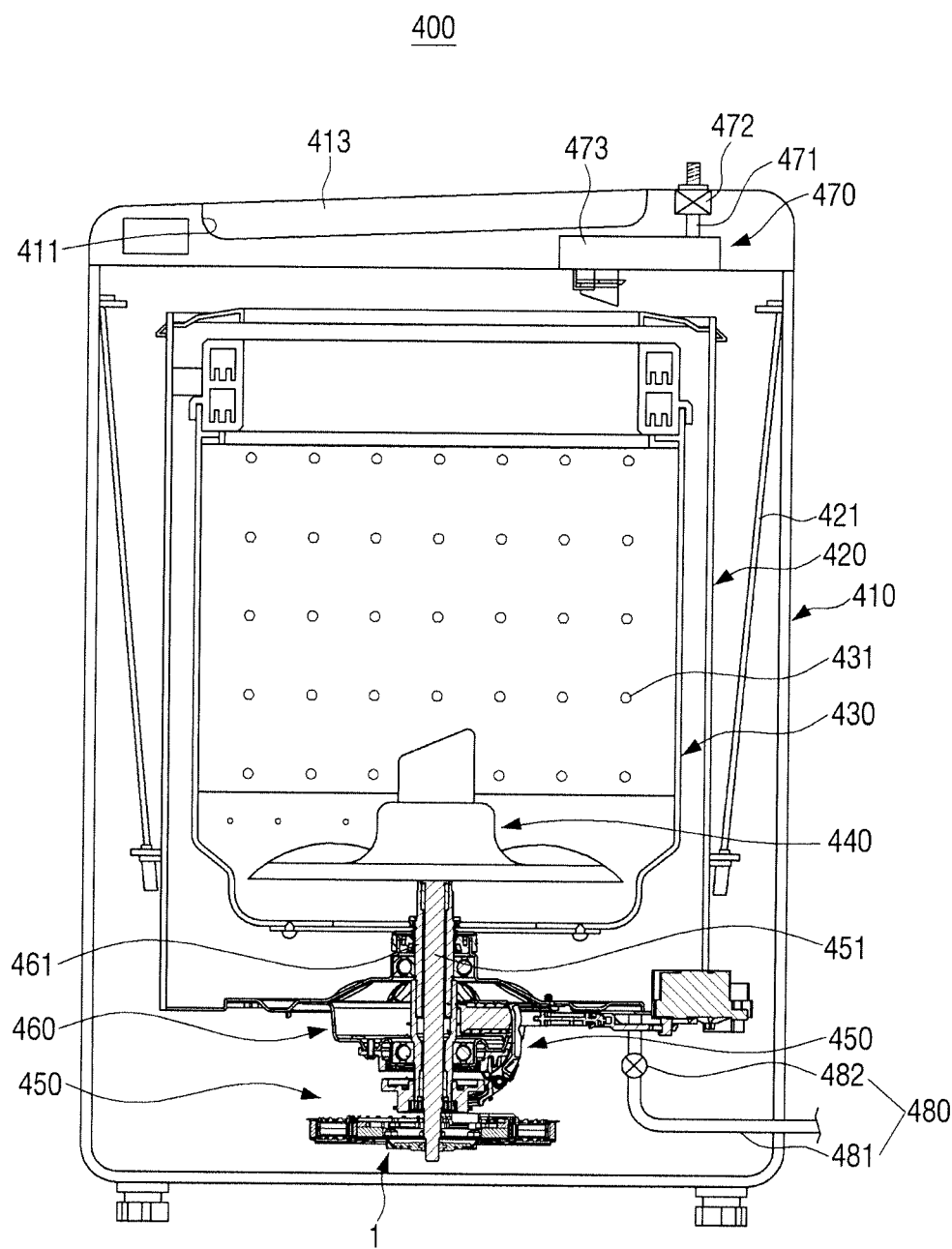
FIG. 19 is a cross-sectional view illustrating another example of a washing machine provided with a motor for a washing machine according to an embodiment of the disclosure.

FIG. 19 is a cross-sectional view illustrating a pulsator washing machine provided with a motor for a washing machine according to an embodiment of the disclosure.

Referring to FIG. 19, a pulsator washing machine 400 may include a cabinet 410, a water tub 420, a dewatering tub 430, a pulsator 440, a driver 450, and a clutch 460.

The cabinet 410 forms an outer appearance of the washing machine 400, and a laundry inlet 411 is provided at the top surface of the cabinet 410 to allow laundry to be introduced into the dewatering tub 420. A door 413 may be provided on the top surface of the cabinet 410 to open and close the laundry inlet 411.

The water tub 420 is disposed inside the cabinet 410 and is configured to receive a predetermined amount of washing water. In addition, the water tub 420 is supported by a suspension apparatus 421 against the cabinet 410, so that the vibration generated in the water tub 420 during washing operation may be reduced.

A water supply apparatus 470 is provided on the upper side of the water tub 420. The water supply apparatus 470 supplies washing water to the water tub 420. The water supply apparatus 470 may include a water supply pipe 471 and a water supply valve 472. One end of the water supply pipe 471 is connected to an external water supply source (not illustrated), and the other end thereof is connected to a detergent supply apparatus 473. The water supplied through the water supply pipe 471 is supplied to the inside of the water tub 420 together with the detergent via the detergent supply apparatus 473. The water supply valve 472 is provided in the water supply pipe 471 and controls the supply of water.

A water drainage apparatus 480 is disposed below the water tub 420. The water drainage apparatus 480 discharges the water used for washing to the outside. The water drainage apparatus 480 may include a drain pipe 481 and a drain valve 482. The drain pipe 481 is connected to a lower portion of the water tub 420 and guides the water used in the water tub 420 to be discharged to the outside. The drain valve 482 is provided in the drain pipe 481 and configured to open and close the drain pipe 481.

The dewatering tub 430 is formed in a substantially hollow cylindrical shape having a bottom, and is rotatably disposed inside the water tub 420. A plurality of through holes 431 are provided in the side surface of the dewatering tub 430 so that the washing water in the dewatering tub 430 can flow out to the water tub 420 and the washing water in the water tub 420 can flow into the dewatering tub 430. The bottom surface of the dewatering tub 430 is coupled to a dewatering shaft 461 of the clutch 460. When the dewatering shaft 461 rotates, the dewatering tub 430 rotates integrally with the dewatering shaft 461.

The pulsator 440 is disposed on the bottom of the dewatering tub 430 and rotates independently from the dewatering tub 430, thereby agitating the laundry introduced into the dewatering tub 430 together with the washing water. The pulsator 440 is connected to the driver 450 by a drive shaft 451. Accordingly, when the driver 450 generates a rotational force, the drive shaft 451 rotates, and when the drive shaft 451 rotates, the pulsator 440 rotates integrally with the drive shaft 451.

The driver 450 is disposed below the water tub 420 and generates a rotational force for rotating the pulsator 440 and the dewatering tub 430. The driver 450 may be implemented by the washing machine motor 1 as described above and the drive shaft 451. The connecting member 50 of the rotor 20 of the washing machine motor 1 is coupled to one end of the drive shaft 451. The one end of the drive shaft 451 may be provided with a serration that may be coupled to the serration 61 of the connecting member 50. Accordingly, when the washing machine motor 1 rotates, the pulsator 440 coupled to the drive shaft 451 rotates.

The clutch 460 is provided to selectively transmit the rotational force of the washing machine motor 1 to a dewatering shaft. Accordingly, in the dewatering process, the pulsator 440 and the dewatering tub 430 may rotate together.

While the embodiments of the disclosure have been described, additional variations and modifications of the embodiments may occur to those skilled in the art once they learn of the basic inventive concepts. Therefore, it is intended that the appended claims shall be construed to include both the above embodiments and all such variations and modifications that fall within the spirit and scope of the inventive concepts.

What is claimed is:

1. A motor for a washing machine, comprising:
   a stator including a coil portion; and
   a rotor, including:
      a rotor casing including a base portion having a disk shape and a vertical wall extending substantially perpendicularly from an outer periphery of the base portion,
      a permanent magnet provided on an inner surface of the vertical wall of the rotor casing, and
      a connecting member provided at a center of the base portion of the rotor casing and connectable with a shaft,
      the base portion of the rotor casing includes:
         a first ring portion extending from the vertical wall to a second ring portion, the first ring portion being aligned with the coil portion along an axial direction of the rotor, wherein an inner surface of the first ring portion facing the coil portion is formed in a flat surface, and
         the second ring portion provided with a plurality of air inlet holes, the second ring portion extending from the connecting member to the first ring portion, the second ring portion protruding past the first ring portion toward the stator, wherein the plurality of air inlet holes of the second ring portion are configured to face the coil portion.

2. The motor for a washing machine of claim 1, wherein the second ring portion includes a side wall protruding from an inner circumferential surface of the first ring portion toward the stator and an upper wall extending from the side wall in parallel with the first ring portion, and
   at least one of the plurality of air inlet holes are disposed in the side wall of the second ring portion.

3. The motor for a washing machine of claim 2, wherein the side wall of the second ring portion is substantially perpendicular to the first ring portion.

4. The motor for a washing machine of claim 1, wherein the second ring portion includes a side wall protruding from an inner circumferential surface of the first ring portion toward the stator and an upper wall extending from the side wall in parallel with the first ring portion, and
   at least one of the plurality of air inlet holes are formed in the side wall and the upper wall, so that the at least one of the plurality of air inlet holes extends from the side wall to the upper wall.

5. A motor for a washing machine, comprising:
   a stator including a coil portion; and
   a rotor, including:
      a rotor casing including a base portion shaped in a circular plate,
      a vertical wall extending substantially perpendicularly from an outer periphery of the base portion,
      a permanent magnet provided on an inner surface of the vertical wall, and
      a connecting member provided at a center of the base portion of the rotor casing and connectable with a shaft,
      the base portion of the rotor casing includes:
         a first ring portion extending from the vertical wall to a second ring portion, the first ring portion being aligned with the coil portion on an axial direction of the rotor, wherein an inner surface of the first ring portion facing the coil portion is formed in a flat surface, and
         the second ring portion, provided with a plurality of air inlet channels configured to guide air outside the rotor casing to the coil portion, the second ring portion extending from the connecting member to the first ring portion and the second ring portion protruding past the first ring portion toward the stator, wherein the plurality of air inlet channels are configured to face the coil portion.

6. The motor for a washing machine of claim 5, wherein at least one of the plurality of air inlet channels includes:
   an inlet configured to allow outside air into the plurality of air inlet channels,
   a reflecting wall extending from a surface of the second ring portion, having a predetermined angle with the inlet, and configured to reflect the outside air to the coil portion, and
   a bottom wall extending from the reflecting wall and connected to the first ring portion.

7. The motor for a washing machine of claim 6, wherein the reflecting wall is substantially perpendicular to the second ring portion.

8. The motor for a washing machine of claim 6, wherein the inlet lies in a plane in a radial direction of the base portion.

9. The motor for a washing machine of claim 8, wherein the reflecting wall is inclined with respect to the radial direction of the base portion.

10. The motor for a washing machine of claim 9, wherein an angle between a plane of the inlet and the reflecting wall is approximately 45 degrees.

11. The motor for a washing machine of claim 5, wherein the second ring portion includes a first side wall protruding from an inner circumferential surface of the first ring portion toward the stator and an upper wall extending from the first side wall in parallel with the first ring portion, and
    the first side wall is provided with a plurality of openings in fluid communication with the plurality of air inlet channels.

12. The motor for a washing machine of claim 5, wherein the connecting member includes:
    an upper connection part provided on a top surface of the base portion,
    a lower connection part provided on a bottom surface of the base portion and coupled with the upper connection part, and
    a serration boss disposed at a center of each of the upper connection part and the lower connection part.

13. The motor for a washing machine of claim 12, wherein
at least one of the upper connection part and the lower connection part of the connecting member has a substantially circular shape.

14. The motor for a washing machine of claim 12, wherein
a plurality of notches are provided on a circumferential surface of at least one of the upper connection part and the lower connection part of the connecting member.

15. The motor for a washing machine of claim 13, wherein
the upper connection part and the lower connection part of the connecting member are integrally molded together.

16. The motor for a washing machine of claim 5, wherein the plurality of air inlet channels are separate from the first ring portion.

17. A motor for a washing machine, comprising:
a stator including a coil portion; and
a rotor, including:
  a rotor casing including a base portion having a disk shape and a vertical wall extending substantially perpendicularly from an outer periphery of the base portion,
  a permanent magnet provided on an inner surface of the vertical wall of the rotor casing, and
  a connecting member provided at a center of the base portion of the rotor casing and connectable with a shaft,
  the base portion of the rotor casing includes:
    a first ring portion extending from the vertical wall to a second ring portion, the first ring portion being aligned with the coil portion along an axial direction of the rotor, wherein an inner surface of the first ring portion facing the coil portion is formed in a flat surface, and,
    the second ring portion, extending from the connecting member to the first ring portion and the second ring portion protruding past the first ring portion toward the stator, and
    a connecting portion, connecting the first ring portion and the second ring portion, provided with a plurality of air inlet holes, wherein the plurality of air inlet holes of the connecting portion are configured to face the coil portion.

18. The motor for a washing machine of claim 17, wherein
each of the plurality of air inlet holes extends from the connecting portion to the second ring portion.

19. A washing machine, comprising:
a water tub;
a load rotatably disposed inside the water tub;
a shaft connected to the load; and
a motor configured to rotate the load through rotation of the shaft, the motor including a stator including a coil portion, and a rotor the rotor including:
  a rotor casing including a base portion shaped in a circular plate and a vertical wall extending substantially perpendicularly from an outer periphery of the base portion,
  a permanent magnet provided on an inner surface of the vertical wall of the rotor casing, and
  a connecting member provided at a center of the base portion of the rotor casing and connected to the shaft,
  the base portion of the rotor casing includes:
    a first ring portion extending from the vertical wall to a second ring portion, the first ring portion being aligned with the coil portion along an axial direction of the rotor, wherein an inner surface of the first ring portion facing the coil portion is formed in a flat surface, and
    the second ring portion, provided with a plurality of air inlet channels configured to guide air outside the rotor casing to the coil portion, the second ring portion extending between the connecting member and the first ring portion and the second ring portion protruding past the first ring portion toward the stator.

20. A motor for a washing machine, comprising:
a stator including a plurality of coils wound around a plurality of cores; and
a rotor, including:
  a rotor casing, in which the stator is accommodated, including a base portion having a disk shape and a vertical wall extending substantially perpendicularly from an outer periphery of the base portion,
  a permanent magnet provided on an inner surface of the vertical wall of the rotor casing, and
  a connecting member provided at a center of the base portion of the rotor casing and connectable with a shaft,
  the base portion of the rotor casing includes:
    a first ring portion extending from the vertical wall to a second ring portion, the first ring portion being aligned with the plurality of coils and the plurality of cores on an axial direction of the rotor, wherein an inner surface of the first ring portion facing the coil portion is formed in a flat surface, and
    the second ring portion provided with a plurality of air inlet holes, the second ring portion having a flat upper surface that is closer to an upper end of the rotor casing than the inner surface of the first ring portion, the second ring portion extending from the first ring portion to the connecting member and spaced apart from the plurality of coils and the plurality of cores in a radial direction of the rotor so as not to face, in the axial direction of the rotor, the plurality of coils and the plurality of cores, wherein the plurality of air inlet holes of the second ring portion are configured to face the plurality of coils.

* * * * *